A. F. ENGEL.
EYELETING MACHINE.
APPLICATION FILED JULY 7, 1911.
1,132,567.
Patented Mar. 23, 1915.
2 SHEETS—SHEET 1.
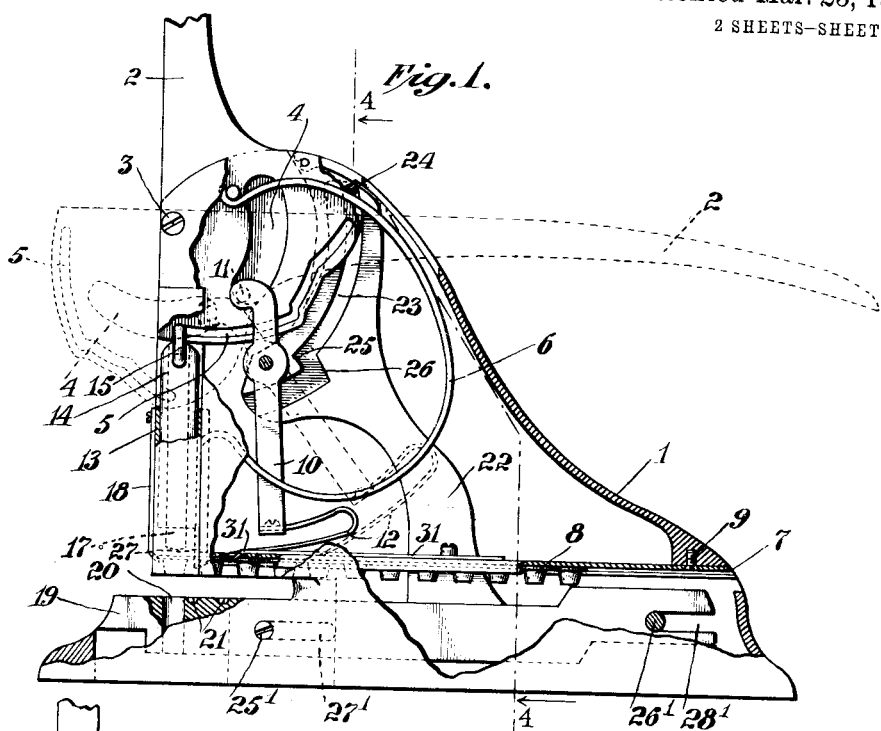
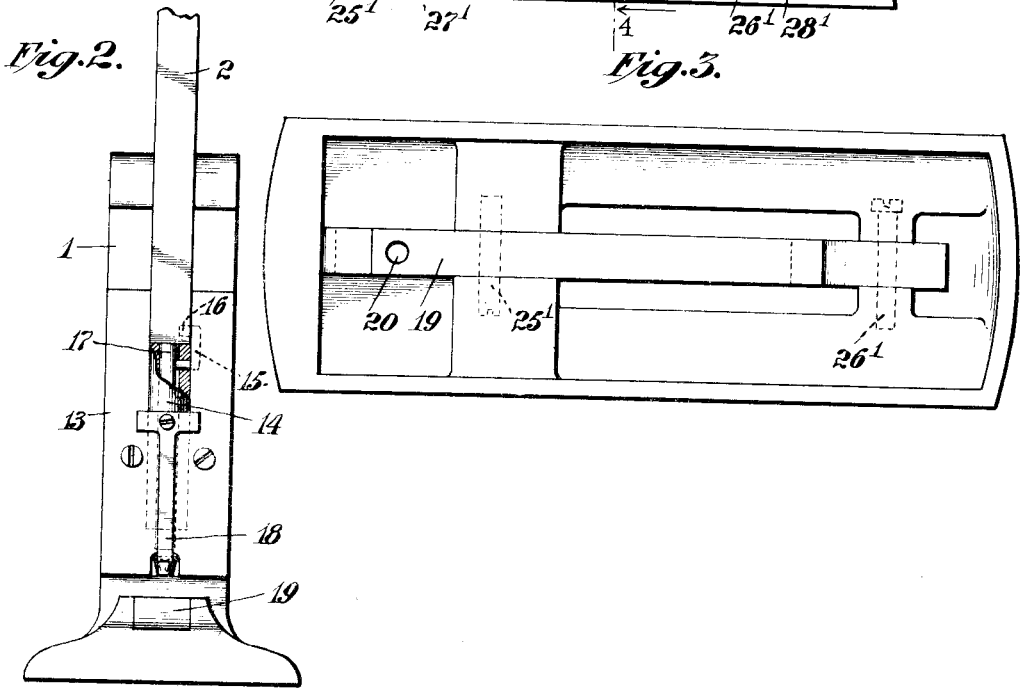
Inventor:
Arthur F. Engel,
by
Atty

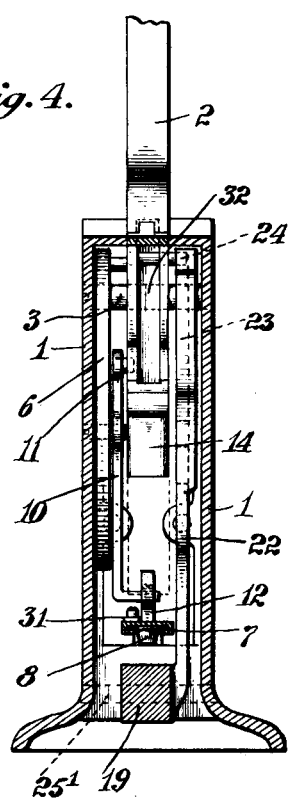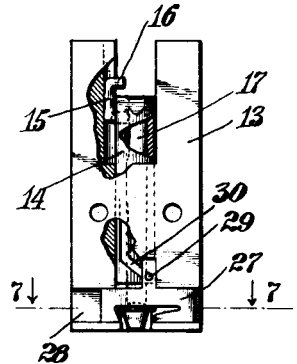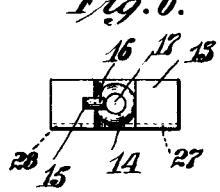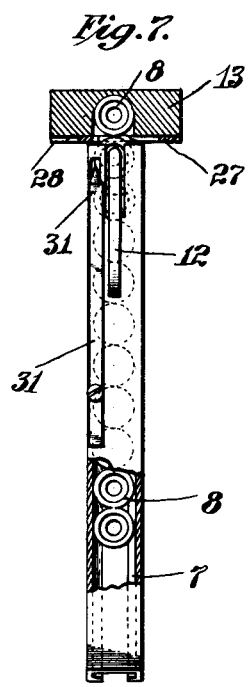

UNITED STATES PATENT OFFICE.

ARTHUR F. ENGEL, OF NEW YORK, N. Y.

EYELETING-MACHINE.

1,132,567. Specification of Letters Patent. Patented Mar. 23, 1915.

Application filed July 7, 1911. Serial No. 637,272.

*To all whom it may concern:*

Be it known that I, ARTHUR F. ENGEL, a citizen of the United States, residing at 305–309 Broadway, New York, N. Y., have invented new and useful Improvements in Eyeleting-Machines, of which the following is a specification.

This invention relates to eyeleting machines, and more especially to machines of this type adapted to be used in fastening papers together.

One of the objects of the invention is to provide a machine by means of which the eyelets may be readily and quickly inserted in position and upset or riveted at one and the same operation.

A further object is to provide a device which will be positive in action and which will not be liable to get out of order.

Other objects will be in part obvious and in part pointed out hereinafter.

In the accompanying drawing showing an illustrative embodiment of this invention and in which the same reference numeral refers to similar parts in the several figures, Figure 1 is a side view of the device, parts being broken away for the sake of clearness. Fig. 2 is a front view of the device, part being shown in section. Fig. 3 is a bottom view of the device. Fig. 4 is a sectional view taken on the line 4—4 of Fig. 1. Fig. 5 is a detailed view of the plunger and eyelet cutting mechanism. Fig. 6 is a top plan view of Fig. 5. Fig. 7 is a sectional view taken on the line 7—7 of Fig. 5 and showing the eyelet feeding mechanism. Fig. 8 is a top plan view of a detail.

Referring to the figures, 1 represents the body portion of the apparatus, and 2 represents the handle portion pivotally supported thereon, as by a pivot 3. The lower end of the handle portion is provided with a recess 4 and a slot 5 for a purpose hereinafter described. The handle is maintained in its upright or normal position, as indicated in solid lines in Fig. 1, in any suitable manner, as, for example, by a spring 6, one end of which engages the body portion 1, and the other end of which engages the handle portion 2.

The machine is especially adapted to be used in connection with strips of connected eyelets, such as are shown and claimed in my copending application No. 634,022, filed June 19th, 1911.

As clearly shown in Figs. 1, 4 and 7, a guideway 7 is provided in which the strip of eyelets 8 is adapted to be held and through which it is adapted to travel. This guideway is preferably made removable and may be held in position in any suitable manner, as, for example, by a screw 9. The eyelets are introduced into the guideway through a suitable opening at the rear of the device, as shown clearly in Fig. 1.

The manner of feeding the eyelets forward into operative position with the punch and riveter or upsetter will now be described.

Pivotally mounted upon the body 1 of the device is an arm 10, one end of which is provided with a pin 11 adapted to engage within the recess 4, and the other end of the arm 10 is provided with an eyelet-engaging member 12, which is preferably resilient and formed as shown in Fig. 1. On account of the resiliency of the member 12, its free end is constantly urged into engagement with the eyelets. The recess 4 is of such length that when the handle portion 2 is in its normal position, the wall at one end of the recess will engage the pin 11 of the arm 10 and hold the arm in the position shown in solid lines in Fig. 1, which is the advanced position of the arm. When the handle portion is moved into its alternate position, as indicated in dotted lines in Fig. 1, the wall at the opposite end of the recess 4 will engage the pin 11 to move the arm 10 into the position indicated in dotted lines in Fig. 1, in which position the free end of the eyelet engaging member 12 will be moved backward to engage one of the eyelets in the rear, and it will be understood that as the handle portion 2 regains its normal position, the arm 10 will be moved forward to occupy its normal position, during which movement the eyelets will be fed forward to bring another eyelet into operative relation with the punch and riveter. Backward movement of the eyelets is prevented as by means of a spring 31 the free end of which extends into the path of the eyelets.

From the above description it will be understood, therefore, that at each operation of the handle portion 2, the eyelets will be fed forward, and such feeding movement takes place practically at the end of the movement of the handle portion 2 as it assumes its normal position.

The punch and upsetting or riveting mechanism which comprise the eyelet fastening means will now be explained:—13 indicates a guiding block in which the hollow plunger 14 is adapted to reciprocate, and the reciprocating movement of the plunger is effected by means of a stud 15 which is secured thereto and which has an inwardly bent portion 16 engaging with the slot 5 in the lower portion of the handle 2. The slot 5 is formed with four distinct portions which are so arranged relatively to the pivot about which the handle moves that the plunger will be actuated in the following manner: During the initial movement of the handle, the plunger 14 and the punch 17, which is mounted therein, will be urged downward a distance sufficient to force the punch through the papers and to force the eyelet through the hole punched through the papers by the punch. As the downward movement of the handle continues, the plunger and punch are raised and are then held stationary, for a purpose hereinafter described, and during the final downward movement of the handle, the plunger is depressed a farther distance for the purpose of upsetting or riveting the eyelet. The punch 17 is free to move with respect to the plunger, but is held in its normal position and is prevented from falling out in any suitable manner, as, for example, by means of the stud 15 engaging a shoulder formed on the punch, as shown in Fig. 2. As shown in Fig. 1, the lower end of the punch normally projects beyond the er end of the plunger and it will be understood from the above description that as the handle is forced downward, the plunger and punch will descend together, the punch passing first through the eyelet and then being forced through the papers to be fastened, and the plunger engaging the flange of the eyelet through which the punch has passed, will force the eyelet into the papers. The eyelet is preferably normally held in position by a resilient member 18, which, as shown, consists of a piece of spring metal having its upper end fastened to the guide block 13 and having its lower or free end turned in slightly to engage with the lower surface of the flange of the eyelet, as clearly shown in Fig. 1. As the plunger 14 descends into engagement with the flange of the eyelet, it will force the eyelet downward, the member 18 moving aside on account of its resiliency to release the eyelet, and, as soon as the plunger returns to its normal position and the eyelet is released, it springs back and assumes its operative position in readiness to engage the flange of the next eyelet, which is fed into its operative position by the mechanism above described.

19 indicates a slidable member provided with a die or opening 20 and with an upsetting or riveting recess 21. The member 19 is also provided with an upwardly extending arm 22, which may be integral therewith, and which is provided with a recess 23 in its upper portion adapted to be engaged by a pin 24 carried by the handle 2. The member 19 may be slidably held in position in any manner, as, for example, by pins 25' and 26' engaging slots 27' and 28' respectively. In its normal position, as shown in Fig. 1, the member 19 is so held that the hole or die 20 is beneath and in registry with the punch 17, and the member is maintained in this position during the time that the punch descends through the eyelet and through the papers for the purpose of punching a hole therein. After the punch has been raised out of the die 20, the member 19 is then moved forward to bring the riveting recess 21 into registry with the lower edge of the eyelet 8. This movement of the member 19 is brought about by the pin 24 striking against the shoulder 25 of the slot 23 during the downward movement of the handle 2 and upon the further downward movement of the handle 1, as above described, the plunger engages the upper flange of the eyelet and forces the eyelet downward, whereby the lower edge thereof forced into the recess 21 will be upset or riveted. During the movement of the handle, the punch 17 passes through the eyelet and rests upon the member 19, thereby forming a guide or support for the eyelet and holding it in position during the upsetting operation. The plunger 14 will move downwardly with respect to the punch 17, the upper end of which will pass into the recess 32 formed in the handle. As the handle is moved in the opposite direction in assuming its normal position, the pin 24 will strike the shoulder 26 of the recess 23, thus moving the member 19 back to its normal position in readiness for the next operation, and, as above described, the return movement of the handle 2 will also through the arm 10 and the eyelet-engaging member 12 feed the eyelets forward so that another eyelet will be brought into operative relation with the plunger and the punch.

When the eyelets are formed in a connected strip, it is necessary that they should be separated from one another, and this is accomplished by the mechanism clearly shown in Fig. 5, in which 27 indicates a cutting knife reciprocatingly mounted in a recess 28 formed in the cutting block 13, and provided with a pin 29 engaging a recess 30 formed in the plunger 14. This recess 30 is so shaped that the initial downward movement of the plunger will cause the knife 27 to travel to the left, as shown in Fig. 5, with its severing edge positioned below the point of connection of the eyelets in which position it remains stationary during the further downward movement of the plunger, which movement of the plunger will force the connecting portion between the eyelets against the knife, thereby severing the eyelet which is being operated upon from the following eyelet. A further downward movement of the plunger 14 has no effect on the knife 27, as the portion of the recess 30 which then engages the pin 29 is so arranged that further movement of the knife is prevented. As the plunger returns to its normal position, the knife 27 will be returned to its normal position, as indicated in Fig. 5, and the various parts of the device are so adjusted that this return movement of the knife occurs prior to the forward feeding of the next eyelet.

The operation of the device is as follows: Assuming the parts to be in the position shown in full lines in Fig. 1, and assuming the eyelets to be as indicated in said figure, there will be one eyelet in operative relation to the punch 17 and plunger 14 and registering therewith. As the handle 2 is pressed down, the punch 17 will pass through the eyelet and through the papers, after which the plunger, engaging the upper surface of the flange of the eyelet, will force the same past the spring 18 and through the hole formed in the papers by the punch, it being understood that prior to the engagement of the plunger 14 with the eyelet, the knife 27 will have been moved to its operative position in readiness to permit the eyelet to be severed from the following eyelets. The plunger and punch will then be raised to free the latter from the hole or die 20 and the member 19 will be moved forward to bring the riveting recess 21 into registry with the lower edge of the eyelet. As the downward movement of the handle continues, the plunger 14 will be moved farther downward forcing the eyelet downward through the papers into the recess 21 and thereby upsetting or riveting the lower edge of the same; and, in the meantime, the arm 10 will have then moved backward to cause the member 12 to engage with one of the rearwardly positioned eyelets. As the handle returns to its normal position, the plunger and punch will be raised, after which the member 19 will be moved rearwardly to occupy its normal position, and the knife 27 will also be moved to occupy its normal position. As the handle reaches its original position the arm 10 will be actuated and the eyelets will then be fed forward so as to bring another eyelet into operative relation to the punch and plunger in readiness for another operation of the machine.

Having described this invention in connection with the illustrative embodiment thereof to the details of which disclosure the invention is not, of course, to be limited, what is claimed as new and what is desired to be secured by Letters Patent is set forth in the appended claims.

1. In an eyeleting machine, in combination, a body portion, eyelet fastening means reciprocatingly mounted therein, a handle pivotally supported by said body portion, said handle being operatively connected to said fastening means to actuate the latter, a guideway adapted to receive the eyelets, and resilient means controlled by the movement of said handle to engage the eyelets within said guideway and feed them to said fastening means.

2. In an eyeleting machine, in combination, a body portion, eyelet fastening means reciprocatingly mounted therein, a handle pivotally supported by said body portion, said handle being provided with a slot, means operatively connected with said fastening means and engaging said slot to actuate the said fastening means when said handle is moved about its pivot, a guideway adapted to receive the eyelets, and resilient means controlled by the movement of said handle to engage the eyelets within said guideway and feed them to said fastening means.

3. In an eyeleting machine, in combination, a body portion, eyelet fastening means reciprocatingly mounted therein, a handle pivotally supported by said body portion, said handle being operatively connected to said fastening means to actuate the latter, a guideway adapted to receive the eyelets, an arm pivotally mounted on said body portion and adapted to be rocked by said handle and a resilient eyelet engaging and feeding member carried by said arm to feed the eyelets along said guideway.

4. In an eyeleting machine, in combination, a body portion, eyelet fastening means reciprocatingly mounted therein, a handle pivotally supported by said body portion, said handle being operatively connected to said fastening means to actuate the latter, a guideway adapted to receive the eyelets, an arm pivotally mounted on said body portion, a pin carried thereby, a recess in said handle adapted to receive said pin and to engage said pin when the handle is in its extreme positions whereby said arm will be rocked upon its pivot and a resilient eyelet engaging and feeding member carried by said arm to feed the eyelets along said guideway.

5. In an eyeleting machine, in combination, eyelet fastening means, actuating means therefor, a guideway adapted to receive the eyelets, said guideway being at right angles to the direction of movement of said fastening means, an arm controlled by the movement of said actuating means, and a resilient eyelet engaging and feeding member carried by said arm to feed the eyelets in said guideway into operative relation with said fastening means.

6. In an eyeleting machine, in combination, eyelet fastening means, actuating means therefor, comprising a handle provided with a recess, a guideway adapted to receive the eyelets, said guideway being at right angles to the direction of movement of said fastening means, a pivoted arm, a pin carried upon one end of said arm, and extending within said recess, and an eyelet engaging and feeding member secured to and carried by the other end of said arm, said recess being so proportioned that as said actuating means is moved from its normal position, said arm will be moved to bring said member into engagement with a succeeding eyelet, and as said actuating means returns to its normal position, said arm will be moved to feed the eyelets.

7. In an eyeleting machine, in combination, eyelet fastening means, actuating means therefor, means for feeding thereto a strip of connected eyelets, a normally inoperative knife, and means controlled by said actuating means for moving said knife into operative position below the connecting point between the eyelet being fastened and the following eyelet, whereby as the fastening means is actuated the eyelet being fastened will be severed from the following eyelet.

8. In an eyeleting machine, in combination, a reciprocatable hollow plunger, a punch mounted therein and movable with respect thereto, actuating means for reciprocating said plunger and adapted to cause said plunger to move downward, then upward, and finally to move downward again, and means for preventing movement of said punch relatively to said plunger during the first downward and upward movement thereof, and to permit movement of said punch relatively to said plunger during the second downward movement thereof.

9. In an eyeleting machine, in combination, a reciprocatable hollow plunger, a punch mounted therein and movable with respect thereto, actuating means for reciprocating said plunger, a stud carried by the plunger, said actuating means comprising a slot with which said stud engages, said slot being shaped to cause said plunger to move downward, then upward, and finally to move downward again, and means for preventing movement of said punch relatively to said plunger during the first downward and upward movement thereof, and to permit movement of said punch relatively to said plunger during the second downward movement thereof.

In testimony whereof I have signed my name to this specification in the presence of two subscribing witnesses.

ARTHUR F. ENGEL.

Witnesses:
WILLIAM P. JONES,
JOHN A. PERCIVAL.